US 8,135,480 B2

(12) United States Patent  
Tanaka et al.

(10) Patent No.: US 8,135,480 B2  
(45) Date of Patent: Mar. 13, 2012

(54) DIGITAL INDICATING CONTROLLER

(75) Inventors: Satoru Tanaka, Musashino (JP);  
Shuichi Mano, Musashino (JP);  
Norihiko Umei, Musashino (JP); Tetsuji Moriyama, Musashino (JP)

(73) Assignee: Yokogawa Electronic Corporation, Tokyo (JP)

( * ) Notice: Subject to any disclaimer, the term of this patent is extended or adjusted under 35 U.S.C. 154(b) by 211 days.

(21) Appl. No.: 12/231,836

(22) Filed: Sep. 5, 2008

(65) Prior Publication Data

US 2009/0240349 A1 Sep. 24, 2009

(30) Foreign Application Priority Data

Sep. 7, 2007 (JP) ................. 2007-232165

(51) Int. Cl.  
*G05B 15/00* (2006.01)
(52) U.S. Cl. ............. 700/18; 700/19; 700/86; 703/13
(58) Field of Classification Search .............. 700/18, 700/19, 23, 13, 22, 86; 703/13, 22; 710/29, 710/315; 717/105, 113  
See application file for complete search history.

(56) References Cited

U.S. PATENT DOCUMENTS

| | | | |
|---|---|---|---|
| 5,042,002 A | | 8/1991 | Zink et al. |
| 5,151,978 A | * | 9/1992 | Bronikowski et al. ........ 709/216 |
| 5,355,482 A | * | 10/1994 | Ohhashi et al. ............... 700/18 |
| 5,410,469 A | * | 4/1995 | Sakamoto et al. ............ 700/9 |
| 5,841,657 A | * | 11/1998 | Hoshino et al. ............ 700/104 |
| 5,850,343 A | * | 12/1998 | Nakamura ................ 700/174 |
| 6,466,827 B1 | * | 10/2002 | Stine .......................... 700/18 |
| 7,272,825 B2 | * | 9/2007 | Inoue et al. ................ 717/126 |
| 7,890,927 B2 | * | 2/2011 | Eldridge et al. ............. 717/110 |
| 2007/0233452 A1 | * | 10/2007 | Sasaki ........................ 703/22 |

FOREIGN PATENT DOCUMENTS

| | | |
|---|---|---|
| JP | 5-241619 A | 9/1993 |
| JP | 6-119066 A | 4/1994 |
| JP | 7-13639 | 1/1995 |
| JP | 07-044090 A | 2/1995 |

OTHER PUBLICATIONS

Chinese Office Action dated Apr. 19, 2010, issued in corresponding Chinese Patent Application 200810214369.7.  
Korean Office Action issued Jun. 1, 2010 for corresponding Korean Patent Application No. 10-2008-0086193.

* cited by examiner

*Primary Examiner* — Dave Robertson  
(74) *Attorney, Agent, or Firm* — Westerman, Hattori, Daniels & Adrian, LLP (57) ABSTRACT

A digital indicating controller outputs data provided by performing control computation of input data and has a communication function with an external apparatus. The digital indicating controller includes a sequence computation section which executes a ladder program with at least any of the input data, the data provided by performing control computation, internal and external setup data, internal and external setup parameters, or data from the external apparatus as condition input and outputs the execution result.

6 Claims, 9 Drawing Sheets

DISPLAY LAMP

SMALL-SIZED SEQUENCER

TEMPERATURE CONTROLLER

*FIG. 11*

PLC

PLC COMMUNICATION CONVERTER

TEMPERATURE CONTROLLER

DIGITAL INDICATING CONTROLLER

TECHNICAL FIELD

The present disclosure relates to a digital indicating controller, which outputs control data provided by computing input data and includes a communication function with an external apparatus.

RELATED ART

A digital indicating controller typified by a temperature controller of panel mount type has a compact configuration wherein functional components of an input processing section, a control computation section, an output processing section, a communication processing section, an operation and display section, a database, etc., are stored in one cabinet. However, the digital indicating controller does not include a sequence control function.

To use the described temperature controller to realize sequence control, it is necessary to combine the temperature controller with a sequencer of a PLC (Programmable Logic Controller), etc. Patent document 1 discloses an art about a temperature controller connected to a sequencer.

Figure 7:
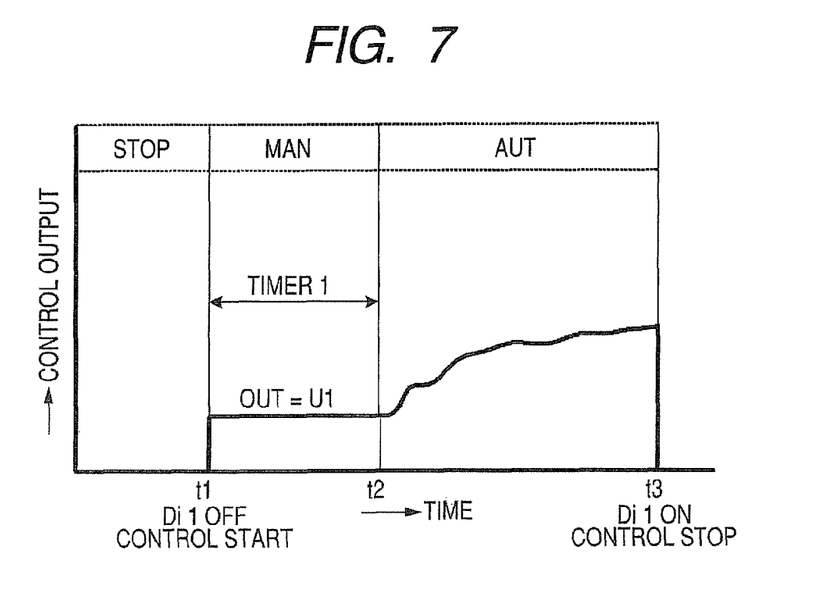
FIG. 7 is a control characteristic drawing of a temperature controller combined with a sequence function.

An embodiment of a temperature controller using an external sequence function will be discussed with FIGS. 7 to 9. FIG. 7 is a control characteristic drawing of a temperature controller combined with a sequence function and applies to warming-up of a heat exchanger.

Control is started at a time t1, MAN fixed output (OUT=U1) is produced with a timer 1 to a time t2 at which the heat exchanger is warmed, AUT control is performed using the control function of the temperature controller from the time t2, and the control is stopped at a time 3 after the expiration of a predetermined time. If AUT is set with an A/M key during MAN operating, AUT operating is started at the point in time. Here, U1 is parameter of output adjustment value.

Figure 8:
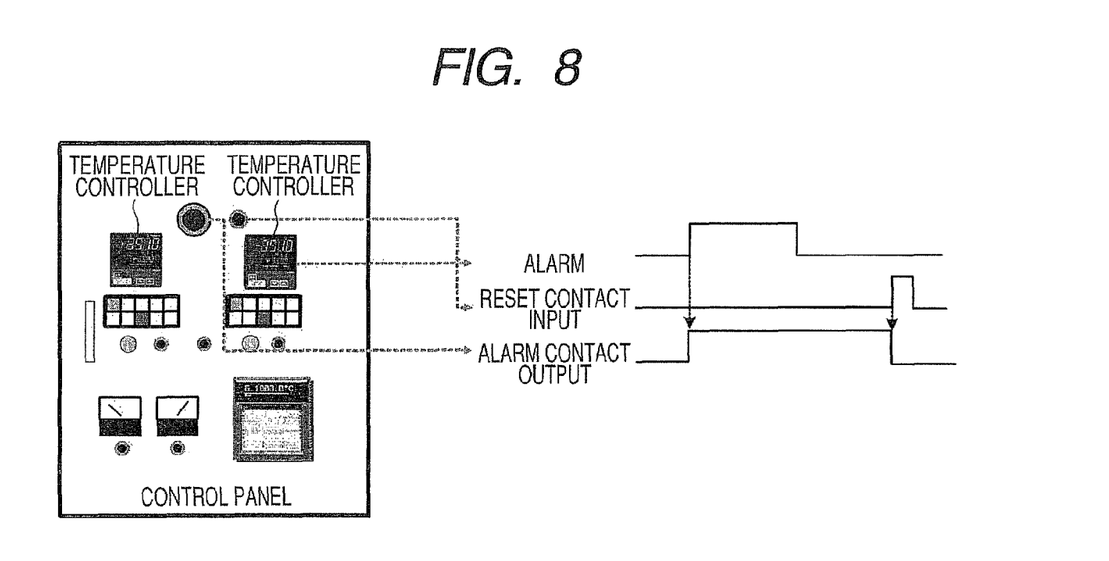
FIG. 8 is a schematic representation of operation of a control panel using alarm output of a temperature controller.

FIG. 8 is a schematic representation of operation of a control panel using alarm output of a temperature controller. If an annunciator alarm occurs and is recovered from, alarm contact output is held and then is released with a reset contact input signal.

Figure 9:
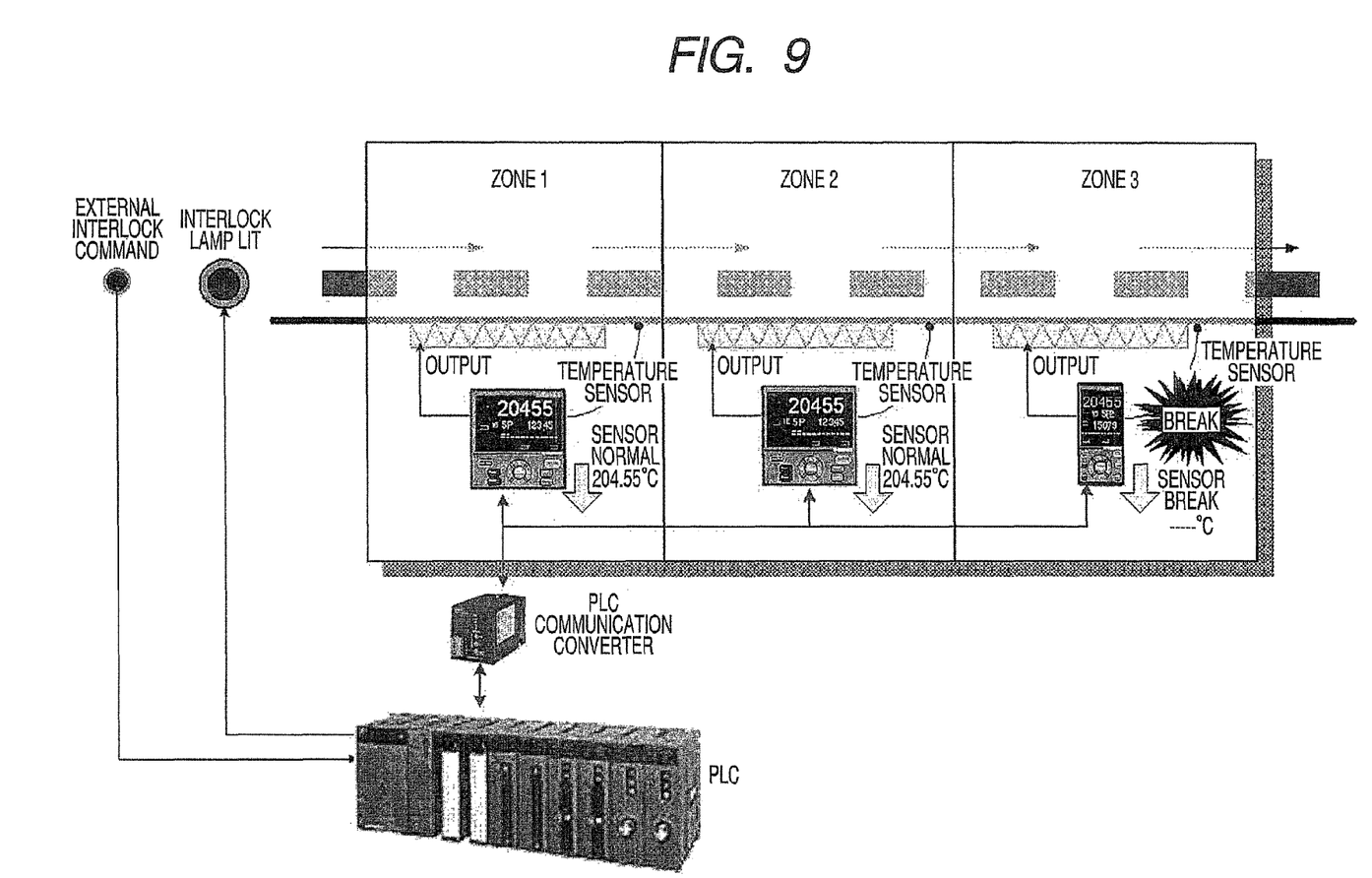
FIG. 9 is a drawing of the configuration of an interlock system using a plurality of temperature controllers and PLC in combination.

FIG. 9 is a drawing of the configuration of an interlock system using a plurality of temperature controllers and a PLC in combination. The system operates as follows:
(1) When a break in a temperature sensor in any of zones 1 to 3 occurs, all temperature controllers in zones 1 to 3 are interlocked.
(2) When an external interlock command is entered, all temperature controllers in zones 1 to 3 are also interlocked.
(3) A lamp is lit at the interlocking time.
[Patent document 1] Japanese Patent Laid-Open No. 013639/1995

Figure 10:
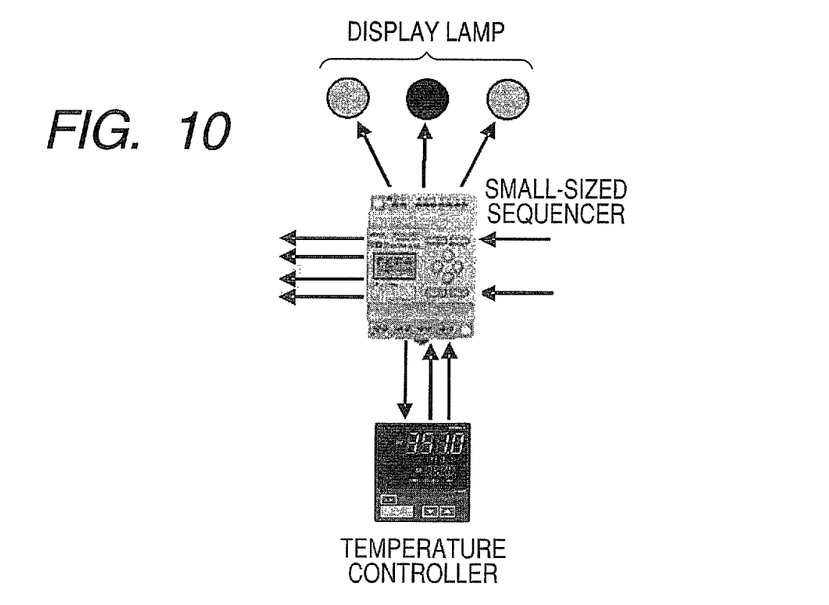
FIG. 10 is a drawing of the basic system configuration wherein a temperature controller and a small-sized sequencer are connected.
Figure 11:
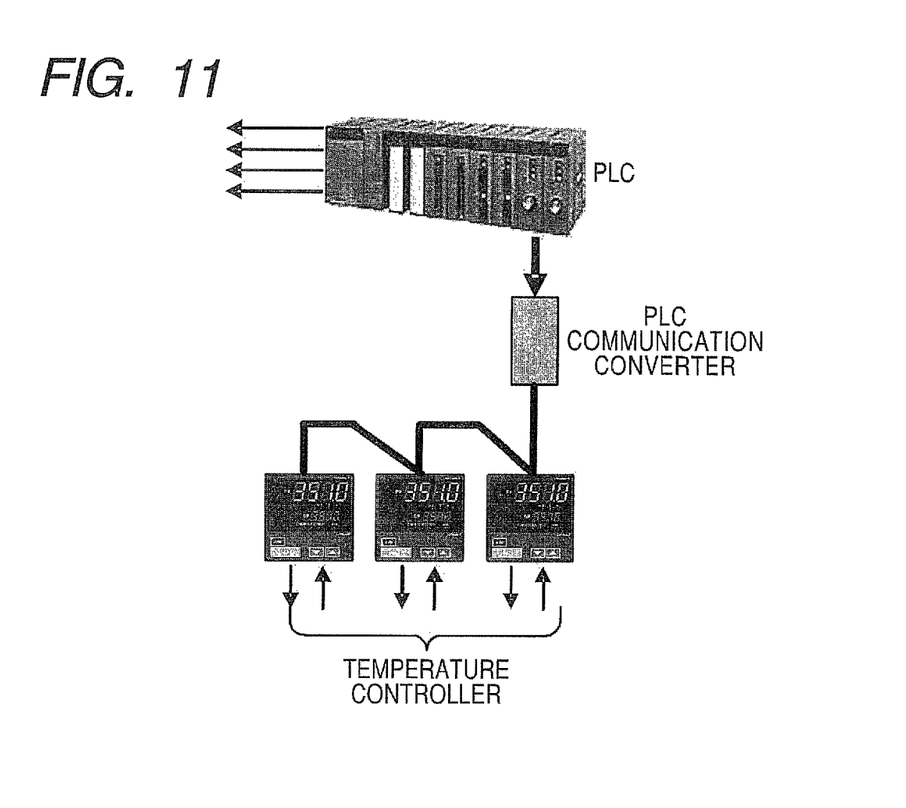
FIG. 11 is a drawing of the basic system configuration wherein a plurality of temperature controllers and a PLC are connected.

The technique using the temperature controllers and the sequencer in combination shown in FIGS. 7 to 9 involves the following problems:
(1) When the switching operation for entering PID control at the time t2 from the starting sequence at the operation starting time shown in FIG. 7 and sequence processing for disturbance accompanying the switching are performed, the program of the main body of the temperature controller is modified and is evaluated in the field and thus much labor and time are required; this is a problem.
(2) FIG. 10 is a drawing of the basic system configuration wherein a temperature controller and a small-sized sequencer are connected. To implement the application shown in FIG. 8, the function of a display/check operation section of an annunciator is provided by connecting the small-sized sequencer and the temperature controller at DI/DO and creating a ladder program, as in FIG. 10. Thus, the small-sized sequencer needs to be attached and be wired to the temperature controller and the program needs to be created and be checked for operation and much labor and time are required; this is a problem.
(3) FIG. 11 is a drawing of the basic system configuration wherein a plurality of temperature controllers and a PLC are connected. To implement the application shown in FIG. 9, the temperature controllers for conducting RS485 communications are connected to the PLC for conducting open network communications through a PLC communication converter and an interlock function is created by a ladder program in the PLC, as in FIG. 11.

Accordingly, the PLC needs to be attached and be wired to the temperature controllers for communications, a communication program needs to be created, and the ladder program needs to be created and be checked for operation and much labor and time are required; this is a problem.

SUMMARY

Exemplary embodiments of the present invention provide a digital indicating controller provided with a sequence computation function as a built-in function that can be maintained from an external apparatus.

Exemplary embodiments of the invention are configured as follows:
(1) A digital indicating controller having a communication function with an external apparatus, the digital indicating controller including:
a sequence computation section which executes a ladder program with at least any of an input data, data provided by performing control computation of the input data, internal and external setup data, internal and external setup parameters, or data from the external apparatus as condition input and outputs the execution result.
(2) The digital indicating controller described in (1) wherein the sequence computation section operates in a shorter period than fixed cycle processing of the control computation.
(3) The digital indicating controller described in (1) or (2) wherein the ladder program is generated in the external apparatus and is downloaded to the sequence computation section by conducting communications.
(4) The digital indicating controller described in any of (1) to (3) wherein the ladder program is generated by ladder program construction software built in parameter setting or tuning software provided for the external apparatus.
(5) The digital indicating controller described in (4) wherein in the operation state of the ladder program, the ladder execution situation is checked by the ladder program construction software.
(6) The digital indicating controller described in any of (1) to (5) wherein the sequence computation section is connected to a different digital indicating controller by machine-to-machine communications and performs sequence operation by sharing information with the different digital indicating controller.
(7) The digital indicating controller described in any of (1) to (6) wherein the sequence computation section acquires failure information from a different digital indicating controller connected by communications and interlocks the connected digital indicating controller.

According to the configuration of the invention, the following advantages can be expected:

(1) The apparatus developing engineer can execute tuning by trial and error in improving the control characteristic by adding a sequence to the control characteristic, control target changing of switching from the starting sequence into continuous control, switching into continuous control as sequence control is temporarily inserted from the effect of disturbance accompanying a process move, etc.

(2) To connect to a control panel, add an annunciator function, and implement an interlock system concerning a single control loop or a plurality of control loops, it is indispensable to add a relay circuit and a PLC outside a temperature controller. However, the external circuits are eliminated, so that cost reduction, a decrease in the number of attachment steps and the number of wiring steps, and space saving can be realized.

(3) A ladder program can be created in a temperature controller of panel mount type in a PC of an external apparatus and the created ladder program is downloaded to the temperature controller, whereby the ladder program can directly access input/output of the temperature controller, process data, control parameters, other set parameters, and various parameters in other loops shared by machine-to-machine communications and can directly change the parameters and input/output for governing control processing of the temperature controller.

(4) Various parameters of a temperature controller, control target values, control target value Nos., setup values of alarm setup value, etc., PV, process values of alarm status, etc., operation manipulation parameters of Auto/Manual, Remote/Local, Run/Stop, etc., actual input/output (AI/AO, DI/DO) of a temperature controller, control parameters for controlling or monitoring control computation of a tracking flag, tracking input, etc., parameters in other loops obtained or given by machine-to-machine communications, and external parameters of actual input/output, etc., can be easily accessed by the internal ladder program.

(5) The function can control the control operation of the temperature controller, actual input/output of the temperature controller, various indicators concerning HMI (numeric display, status display, bar graph), and various operation devices (operation keys, DI terminal input, communication input, parameters).

(6) Data is written directly into the status or bar graph numeric display section of the temperature controller or input is read, whereby the set marker engineer can construct a familiar ladder program and repeat an experiment without bringing the program in the temperature controller into the manufacturer, modifying the program, and operating the program in an actual machine to check the result; diligent tuning can be executed in the field.

(7) A ladder program with which the user (set marker engineer, end user taking charge of instrumentation) is familiar is used, so that it is made possible to easily improve the control characteristic of the temperature controller, construct HMI (annunciator, operation button) as a apparatus or a control panel, and construct an abnormal processing sequence at the time of occurrence of an abnormal condition.

(8) Ladder program construction software can be built in formerly provided parameter setting, tuning software of a temperature controller, a ladder program can be constructed using the software, and constructed execution data can be downloaded to the temperature controller for operation.

(9) Ladder program construction software can be used as a monitor tool for checking input/output of a device used in ladder (parameter, input/output) and a ladder instruction to check the ladder execution situation in the operation state of the temperature controller.

Other features and advantages may be apparent from the following detailed description, the accompanying drawings and the claims.

DETAILED DESCRIPTION

Figure 1:
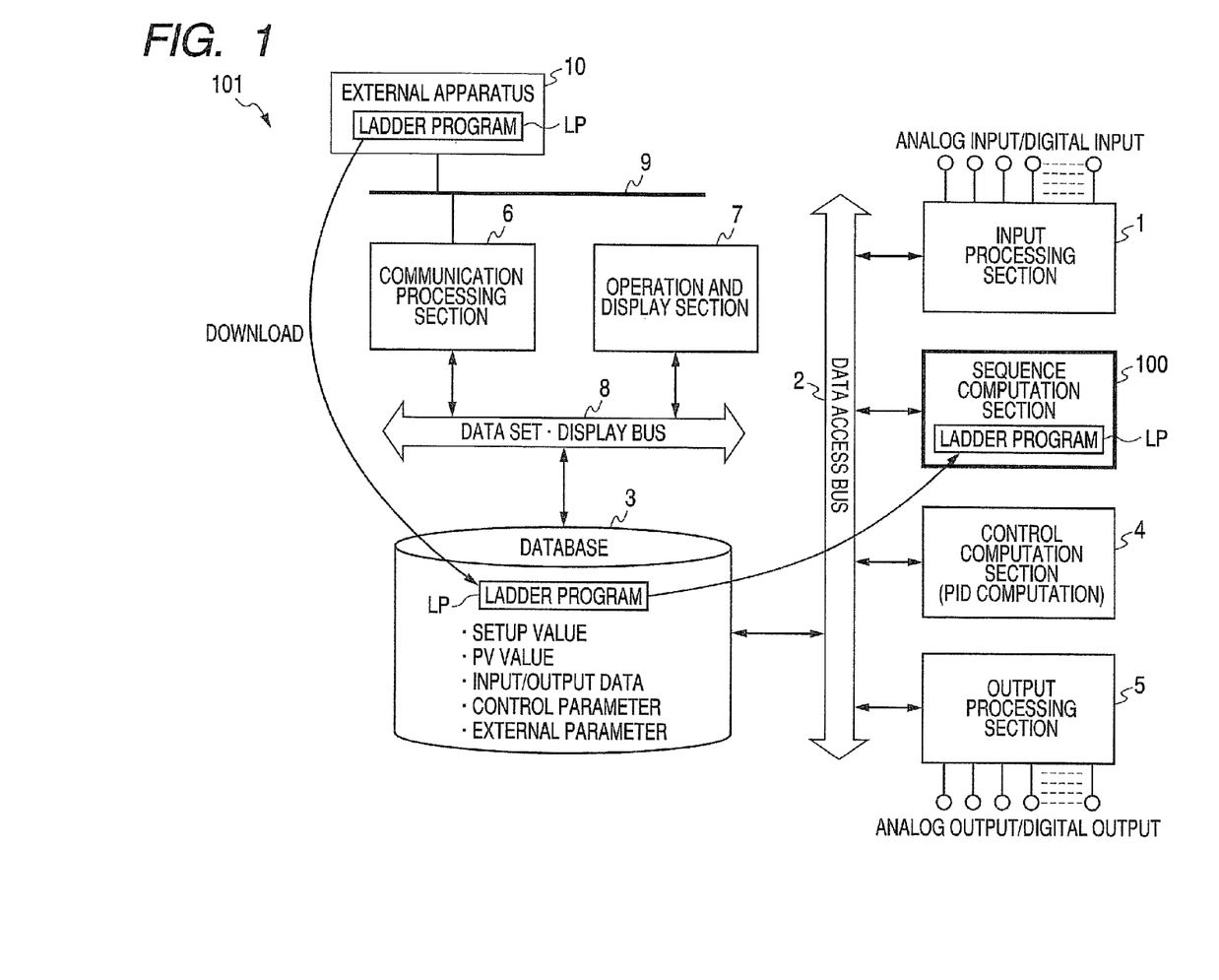
FIG. 1 is a functional block diagram to show one embodiment of a digital indicating controller incorporating the invention.

The invention will be discussed in detail with the accompanying drawings. FIG. 1 is a functional block diagram to show one embodiment of a digital indicating controller 101 incorporating the invention. An example of applying the digital indicating controller to a temperature controller will be discussed below:

The temperature controller is made up of an input processing section 1, a data access bus 2, a database 3, a control computation section 4, an output processing section 5, a communication processing section 6, an operation and display section 7, and a data set display bus 8. The communication processing section 6 communicates with an external apparatus 10 such as a PC through a communication network 9.

The characteristic section in the configuration of the invention added to the components of the temperature controller is a sequence computation section 100 for communicating with the database 3 through the data access bus 2 and operating with a ladder program LP. The ladder program LP is generated in the external apparatus 10 and is downloaded through the communication network 9 and the communication processing section 6. The functions of the components are as follows:

The input processing section 1 inputs temperature measurement values of PV (process input value), RSP (remote set input value), etc., analog data of voltage, current, etc., and digital data of operation mode switching, setup value switching, etc., and executes input processing computation of linearizing computation, scaling computation, etc. The data processed in the input processing section 1 is stored in the database 3 through the data access bus 2. In this case, the computation period is T or T/n (where n is 1 or more).

The control computation section 4 executes computation processing of PID computation, auto tuning computation, alarm processing computation, etc., as a control computation function previously installed in the temperature controller. In the computation processing, the setup data, the process value, the operation manipulation parameter, the input/output value, the control parameter, and the external parameter stored in the database 3 through the data access bus 2 can be referenced and changed. In this case, the computation period is T.

The sequence computation section 100 executes the ladder program LP, which was previously created in the external apparatus 10 and downloaded. In processing of the sequence computation section 100, the setup data, the process value, the operation manipulation parameter, the input/output value, the control parameter, and the external parameter stored in the database 3 through the data access bus 2 can be referenced and changed. In this case, the computation period is T/n.

The output processing section 5 acquires necessary data through the data access bus 2 from among various pieces of output information of the parameter, status, etc., to be output as a result of control computation and sequence computation stored in the database 3, and outputs the data to the outside in various modes. In this case, the output computation period is T or T/n.

Analog values of 4 to 20 mA, 1 to 5 V, etc., and digital values of alarm, event, status, etc., based on relay output, voltage pulse output, triac output, and transistor output are output.

The following parameters are saved and loaded between the input processing section 1, the sequence computation section 100, the control computation section 4, and the output processing section 5 and the database 3 through the data access bus 2:
(1) Setup value: Control target value, control target No., alarm setup value, etc.
(2) Process data: PV, alarm status, etc.
(3) Input/output data: AI (PV, RSP, etc.,), AO (MV, RET output value, etc.,), DI (operation manipulation signal, etc.,), DO (alarm output, event output, status output, etc.)
(4) External parameter: Various parameters of different loop provided by machine-to-machine communications The communication processing section 6 includes the following three functions:
(1) Tool dedicated communication function of temperature controller:
Parameters of parameter setting, control tuning, etc., realized in the external apparatus 10 such as a PC and a ladder program created with ladder program construction software are downloaded to the database 3 through the data set display bus 8. Conversely, various parameters existing in the database 3 are passed through the data set display bus 8 to a tool in the external apparatus 10 for monitoring.
(2) Communication function with superior machines
Specified data is read from the database 3 through the data set display bus 8 in accordance with a read command from a superior machine such as a PC, a PLC, or a display. Conversely, data is written into the database 3 through the data set display bus 8 in accordance with a write command from a superior machine.
(3) Machine-to-machine communication function with temperature controller in different loop
A parameter of a temperature controller in a different loop previously registered in the home loop is acquired or based on provided information, specified data is written into or read from the database 3 through the data set display bus 8.

The operation and display section 7 writes data set by key operation into the database 3 through the data set display bus 8. Conversely, specified data through the data set display bus 8 is read through the data set display bus 8 and is displayed on a numeric display section, a status display section, a bar graph display section of the operation and display section 7.

Figure 2:
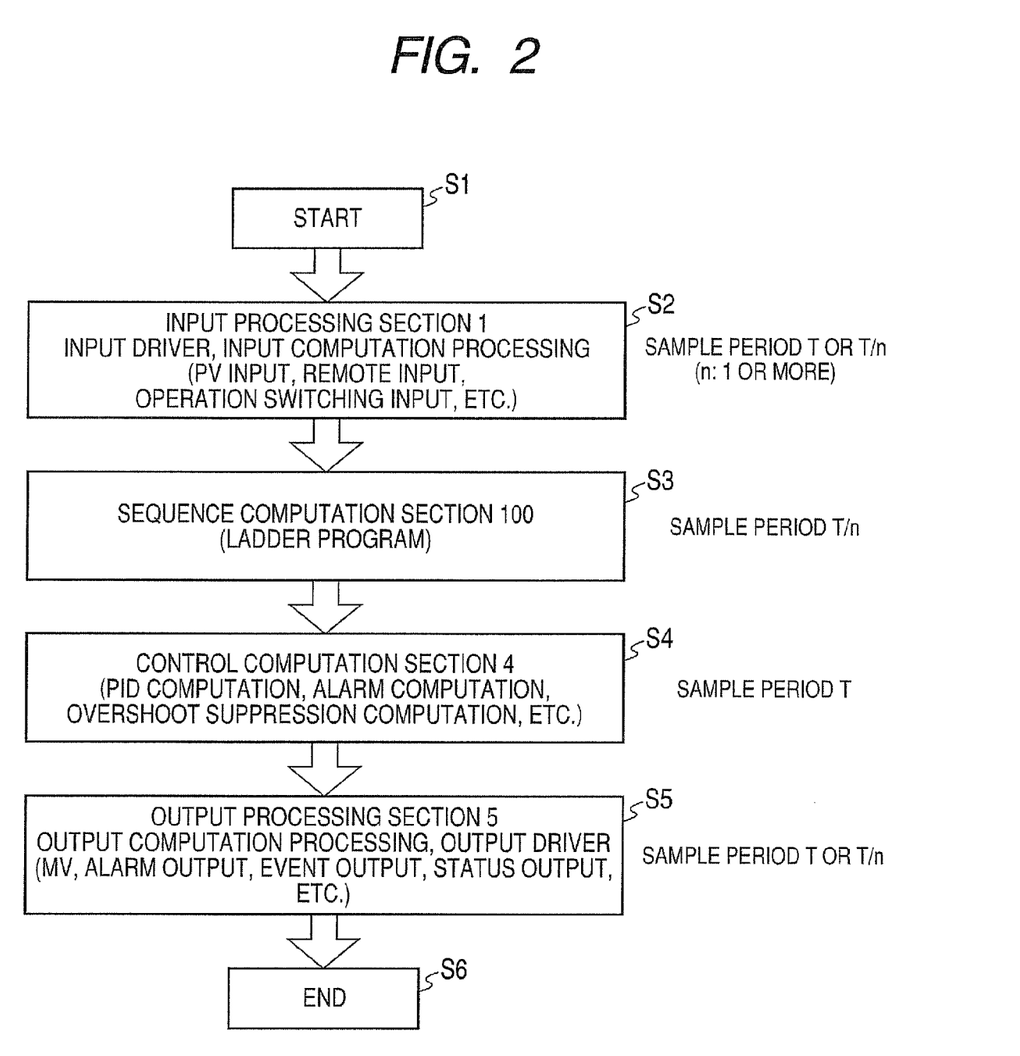
FIG. 2 is a flowchart to describe a signal processing procedure of the digital indicating controller incorporating the invention.

The following parameters are set in the database 3 from the operation and display section 7 through the data set display bus 8 or are displayed on the operation and display section 7 from the database 3. Parameters are set from a superior machine and data is set from the ladder program, the tuning tool, and a temperature controller in a different loop through the communication processing section 6.
(1) Setup value: Control target value, control target No., alarm setup value, etc.
(2) Process data: PV, alarm status, etc.
(3) Input/output data: AI (PV, RSP, etc.,), AO (MV, RET output value, etc.,), DI (operation manipulation signal, etc.,), DO (alarm output, event output, status output, etc.)
(4) External parameter: Various parameters of different loop provided by machine-to-machine communications FIG. 2 is a flowchart to describe a processing procedure of the digital indicating controller incorporating the invention. When fixed cycle processing is started at step S3, processing of the input processing section 1 is executed and then processing of the sequence computation section 100 is executed at step S3.

Further, processing of the control computation section 4 is executed at step S4 and then processing of the output processing section 5 is executed at step S5 and the control cycle processing is terminated at step S6. The processing of the input processing section 1, the control computation section 4, and the output processing section 5 operates in a stationary sample period T suited to general process response speed, but the processing of the sequence computation section 100 operates in a sample period T/n at speed n times as fast as the response speed (where n is 1 or more). A part of input processing or output processing used in sequence computation also operates in T/n.

The input processing section 1 and the output processing section 5 also operate partially in the sample period T/n at high speed. The operation at the speed applies to feedback input of position proportional control, valve opening, closing signal output, etc., for example.

Figure 3:
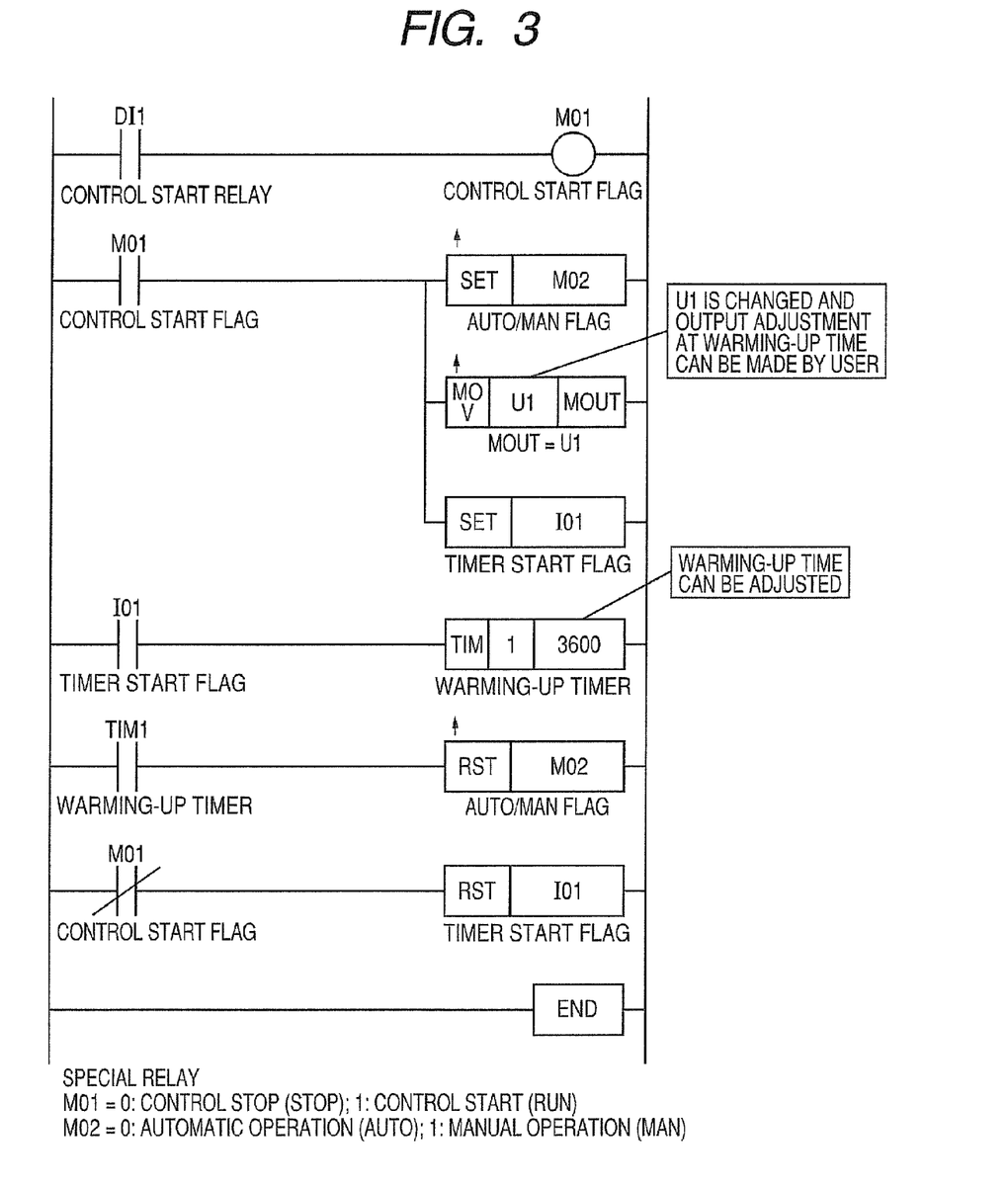
FIG. 3 is a ladder diagram relay ladder diagram of a ladder program for executing sequence computation shown in FIG. 7.

FIG. 3 is a ladder diagram relay ladder diagram to show an example of a ladder program generated in the external apparatus 10 and downloaded to the sequence computation section 100. The ladder diagram executes sequence control aiming at warming-up of a heat exchanger described with FIG. 7.

Figure 4:
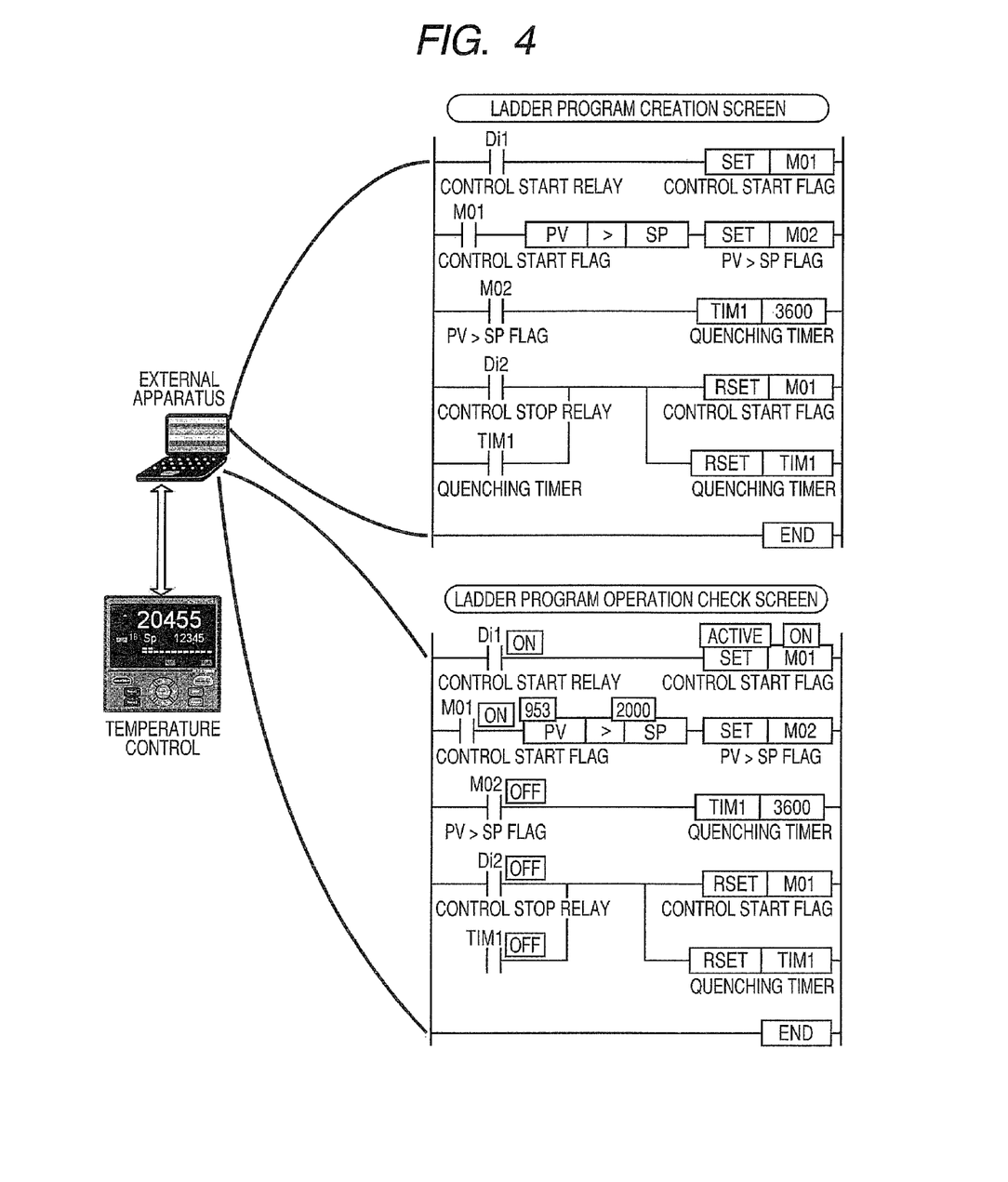
FIG. 4 is an image drawing to describe operation check of a ladder program generated in an external apparatus and downloaded to a temperature controller.

FIG. 4 is an image drawing to describe operation check of a ladder program generated in the external apparatus 10 and downloaded to a temperature controller. A is a ladder program creation screen created with ladder program construction software of an external apparatus and downloaded to a temperature controller, and B is a ladder program operation check screen called from the temperature controller to a monitor tool of the external apparatus.

In the operation check state, the temperature controller is placed in an operation state, the internal device value and the ladder program state are read and are displayed on a ladder diagram relay ladder diagram, and the normal operation is checked. The ladder program construction software and the monitor tool included in the external apparatus can be fused with a parameter setting tool and a tuning tool provided for the temperature controller as standard tools.

Figure 5:
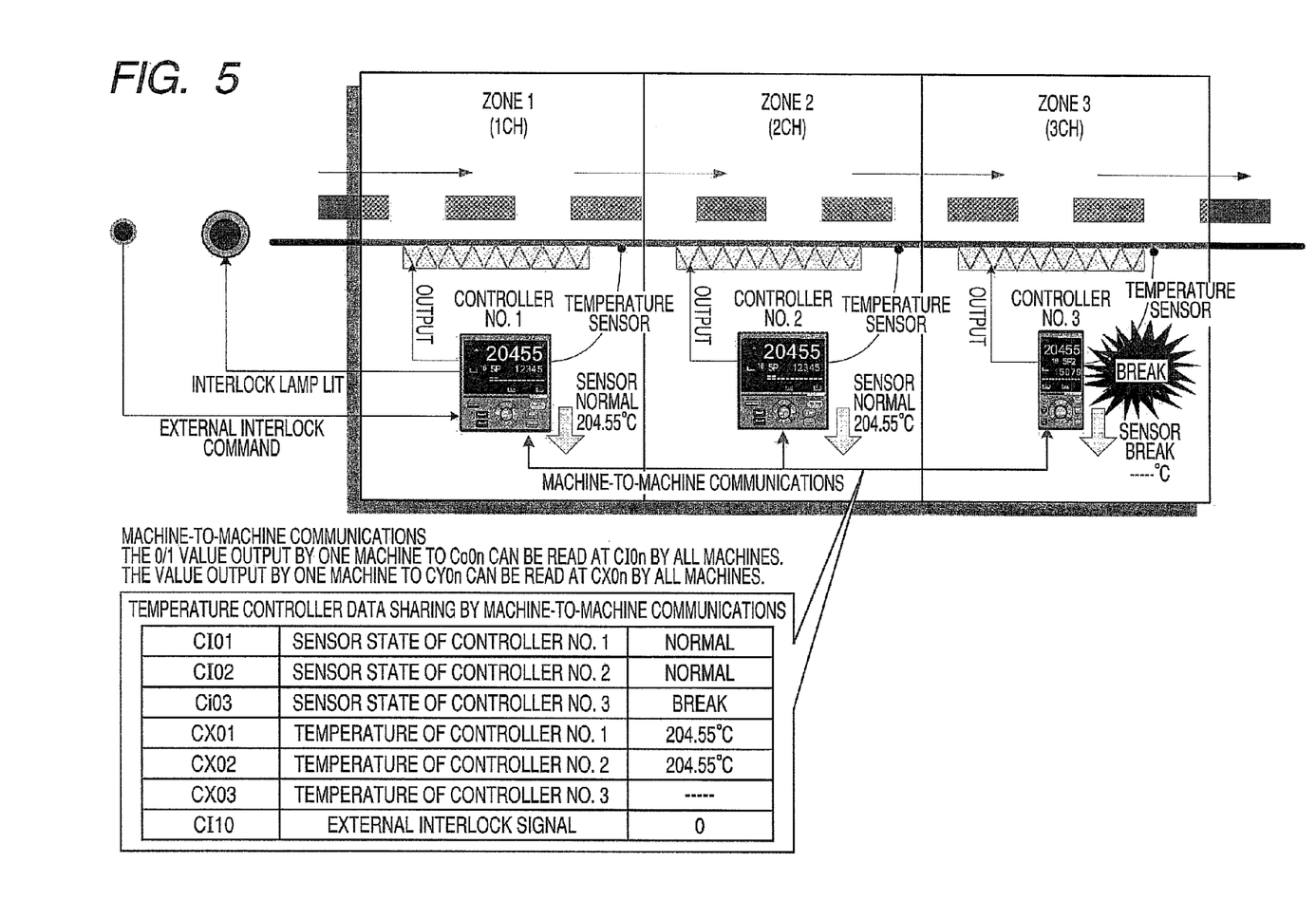
FIG. 5 is a system configuration drawing to describe data sharing by machine-to-machine communications and interlock processing.

FIG. 5 is a system configuration drawing to describe data sharing by machine-to-machine communications and interlock processing. The data sharing function makes it possible to share data of a sensor break state, a measurement value, etc. The machine-to-machine communication function and the ladder program function are used in combination, whereby data in a plurality of loops can be processed by the ladder program and the operation in a plurality of loops can be specified collectively, so that an interlock mechanism of the system can be constructed easily.

Figure 6:
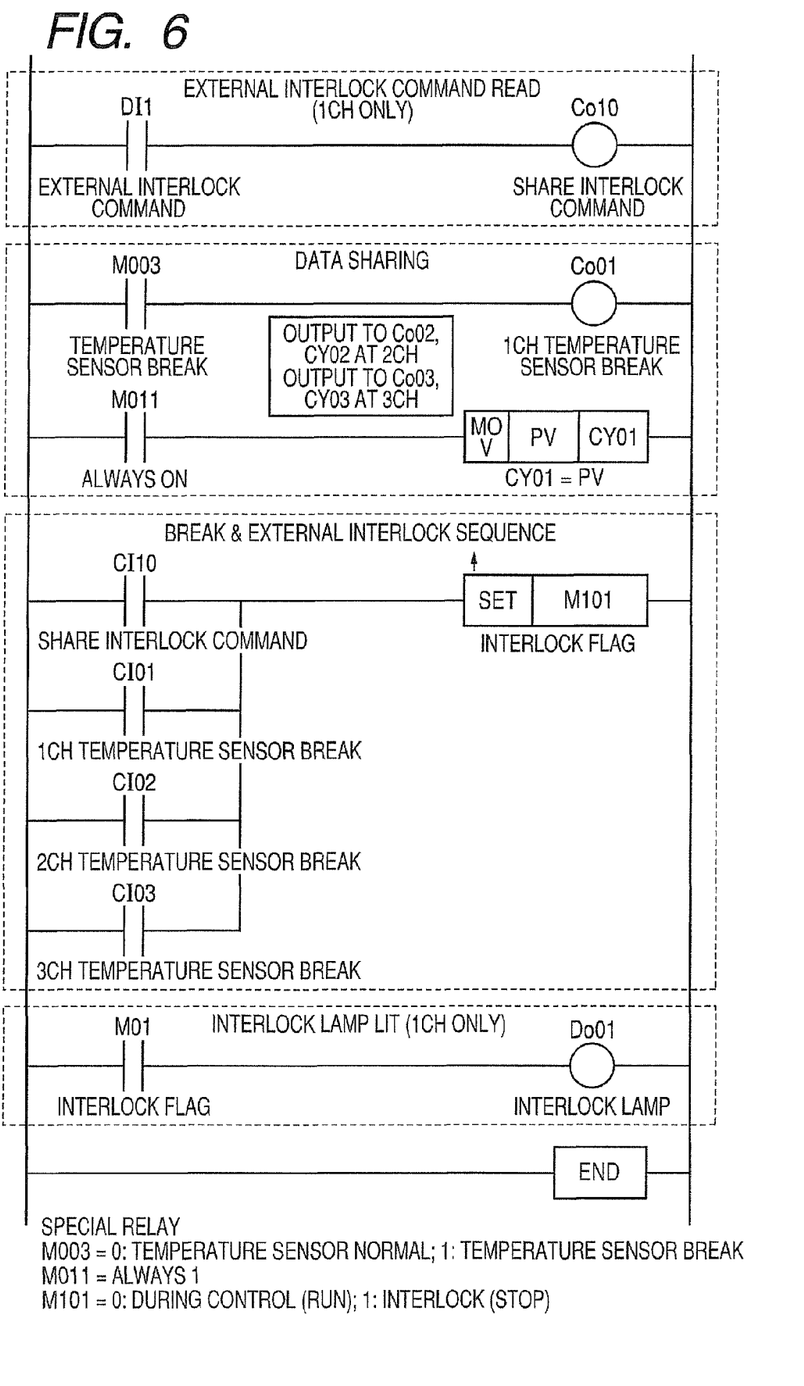
FIG. 6 is a ladder diagram relay ladder diagram of a ladder program for executing the interlock processing in FIG. 5.

FIG. 6 is a ladder diagram relay ladder diagram of a ladder program for executing the interlock processing in FIG. 5. A sensor break of the temperature controller in each channel is monitored and when any break is detected or the condition of an external interlock command is satisfied, an interlock lamp is lit.

In the embodiment, the application example to the temperature controller typifying the digital indicating controller has been described, but the invention can be applied to general digital indicating control aiming at other process amounts of flow quantity, pressure, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A digital indicating controller having a communication function with an external apparatus, said digital indicating controller comprising:

an input processing means for inputting at least one of analog input and digital input as input data;

a control computation means for performing control computation using the input data and outputting a computation result;

a sequence computation means for executing a ladder program with at least any of the input data, the computation result, internal and external setup data, internal and external setup parameters, and data from the external apparatus as condition input, and outputting an execution result; and an output processing means for outputting the computation result from the control computation means and the execution result from the sequence computation means, wherein the ladder program is generated by ladder program construction software, the ladder program construction software being built in parameter setting software or tuning software, the parameter setting software and the tuning software being provided in the external apparatus.

2. The digital indicating controller as claimed in claim 1 wherein said sequence computation means operates in a shorter period than a fixed cycle processing of the control computation means.

3. The digital indicating controller as claimed in claim 1 wherein the ladder program is generated in the external apparatus and is downloaded to said sequence computation section by conducting communications.

4. The digital indicating controller as claimed in claim 1 wherein in the operation state of the ladder program, the ladder execution situation is checked by the ladder program construction software.

5. The digital indicating controller as claimed in claim 1 wherein said sequence computation means is connected to a different digital indicating controller by machine-to-machine communications and performs sequence operation by sharing information with the different digital indicating controller.

6. The digital indicating controller as claimed in claim 1 wherein said sequence computation means acquires failure information from a different digital indicating controller connected by communications and interlocks the connected digital indicating controller.

\* \* \* \* \*